United States Patent
Burchett (10) Patent No.: US 11,870,232 B2
(45) Date of Patent: Jan. 9, 2024

(54) BATTERY ELECTRIC VEHICLE SUPERMODULE

(71) Applicant: VOLVO TRUCK CORPORATION, Gothenburg (SE)

(72) Inventor: Chad Burchett, Browns Summit, NC (US)

(73) Assignee: VOLVO TRUCK CORPORATION, Gothenburg (SE)

( * ) Notice: Subject to any disclaimer, the term of this patent is extended or adjusted under 35 U.S.C. 154(b) by 391 days.

(21) Appl. No.: 16/994,235

(22) Filed: Aug. 14, 2020

(65) Prior Publication Data

US 2022/0052306 A1 Feb. 17, 2022

(51) Int. Cl.
| | |
|---|---|
| *B60R 16/033* | (2006.01) |
| *B60R 16/04* | (2006.01) |
| *H02G 5/06* | (2006.01) |
| *B60L 50/60* | (2019.01) |
| *H02G 5/10* | (2006.01) |
| *B60L 50/50* | (2019.01) |
| *B60L 58/32* | (2019.01) |
| *H02B 1/56* | (2006.01) |
| *H02G 3/03* | (2006.01) |

(52) U.S. Cl.
CPC ............ *H02G 5/10* (2013.01); *B60L 50/50* (2019.02); *B60L 50/66* (2019.02); *B60L 58/32* (2019.02); *H02B 1/56* (2013.01); *H02G 3/03* (2013.01)

(58) Field of Classification Search
CPC .. H02G 5/10; H02G 3/03; B60L 50/50; B60L 50/66; B60L 58/32; H02B 1/56
USPC ........................................................ 320/104
See application file for complete search history.

(56) References Cited

U.S. PATENT DOCUMENTS

| | | | | |
|---|---|---|---|---|
| 5,969,938 A | * | 10/1999 | Byrne ................. | H05K 7/1457 361/678 |
| 6,205,029 B1 | * | 3/2001 | Byrne ................. | H05K 7/1457 174/68.2 |

(Continued)

FOREIGN PATENT DOCUMENTS

| | | |
|---|---|---|
| EP | 0907233 A2 | 4/1999 |
| EP | 0907233 A3 | 4/1999 |

OTHER PUBLICATIONS

European Search Report dated May 16, 2022 in corresponding European Patent Application No. 21183908.9, 14 pages.

*Primary Examiner* — Anatoly Vortman
(74) *Attorney, Agent, or Firm* — Venable LLP; Jeffri A. Kaminski (57) ABSTRACT

An electrical power distribution module for a vehicle. The electrical power distribution module provided with an upper module and a lower module. The upper module provided with circuit boards for various vehicle components and a temperature control system. The lower module provided with a plurality of isolated busbars, isolated from the surrounding structure. Each isolated busbar is one of a positive busbar, a negative busbar, and a ground busbar. The plurality of isolated busbars are arranged on opposite sides of the lower module and are arranged in an alternating fashion based on polarity. The plurality of isolated busbars are electrically connected to the circuit boards. The plurality of electrical connectors are spaced apart from each other and are configured to provide power and ground connections for the vehicle components. The plurality of isolated busbars are configured to carry different voltages.

11 Claims, 4 Drawing Sheets

(56) References Cited

U.S. PATENT DOCUMENTS

| | | | |
|---|---|---|---|
| 10,305,264 B2* | 5/2019 | Brett | H02B 1/20 |
| 10,916,934 B2* | 2/2021 | Witkoe | H02H 7/22 |
| 10,985,537 B2* | 4/2021 | Yang | H02M 7/003 |
| 2005/0237724 A1* | 10/2005 | Fiorentino | G06F 1/189 |
| | | | 361/752 |
| 2010/0089641 A1* | 4/2010 | Esmaili | H05K 7/1432 |
| | | | 174/70 B |
| 2010/0173509 A1* | 7/2010 | Holbrook | H05K 7/1432 |
| | | | 439/208 |
| 2014/0239712 A1* | 8/2014 | Yoon | B60L 50/51 |
| | | | 307/10.1 |
| 2015/0003019 A1* | 1/2015 | Ide | H05K 7/02 |
| | | | 361/728 |
| 2017/0033704 A1 | 2/2017 | Lei et al. | |
| 2017/0347484 A1 | 11/2017 | Lei et al. | |
| 2021/0078446 A1* | 3/2021 | Wang | B60M 1/30 |

* cited by examiner

BATTERY ELECTRIC VEHICLE SUPERMODULE

TECHNICAL FIELD

Embodiments of the present disclosure relate generally to a supermodule for a battery electric vehicle, and more particularly, a supermodule for cable connections between components for a battery electric vehicle.

BACKGROUND

Currently, vehicles, such as electric and hybrid-electric vehicles, require a lot of components to operate the vehicle. With the large number of components on a battery electric vehicle (BEV), there is congestion of power, ground, and signal cables, as well as coolant pipes, which makes the area around all of the electrical components very difficult to connect all the media as well as work on them when service is required.

SUMMARY

According to an embodiment, an electrical power distribution module for a vehicle may include an upper module, the upper module may include at least one circuit board configured for mounting in the upper module; and a temperature control system, the temperature control system configured to control a temperature of the at least one circuit board; a plurality of electrical connectors configured for a plurality of different voltages, wherein each electrical connector is one of a positive connector, a negative connector, and a ground connector; and a lower module coupled to the upper module, the lower module comprising a plurality of isolated busbars, wherein each isolated busbar is electrically isolated from the surrounding structure, wherein each isolated busbar is one of a positive busbar, a negative busbar, and a ground busbar, wherein the plurality of isolated busbars arranged on opposite sides of the lower module and are arranged in an alternating fashion based on polarity, and wherein each isolated busbar is electrically connected to the plurality of electrical connectors having corresponding voltages and polarity, wherein the plurality of isolated busbars are electrically connected to the at least one circuit board, wherein the plurality of electrical connectors are spaced apart from each other and are configured to provide power and ground connections for at least one vehicle component, wherein a first set of the plurality of isolated busbars is arranged on a first side of the lower module and a second set of the plurality of isolated busbars is arranged on a second side of the lower module opposite the first side, wherein each isolated busbar of the first set of the plurality of isolated busbars corresponds to a different voltage, and wherein each isolated busbar of the second set of the plurality of isolated busbars corresponds to a different voltage.

According to an embodiment, a module of an electrical power distribution module for a vehicle, may include a first tiered section having a first step and a second step; a second tiered section having a first step and a second step, wherein the second tiered section is spaced part from the first tiered section; a front surface; and a back surface arranged opposite the front surface, wherein the first tiered section is disposed on a first side between the front surface and the back surface, wherein the second tiered section is disposed on a second side between the front surface and the back surface, wherein a first higher voltage busbar and a first higher voltage electrical connector are coupled to the first step of the first tiered section, wherein a second higher voltage busbar and a second higher voltage electrical connector are coupled to the first step of the second tiered section, wherein a first lower voltage busbar and at least one first lower voltage electrical connector are coupled to the second step of the first tiered section, and wherein a second lower voltage busbar and at least one second lower voltage electrical connector are coupled to the second step of the second tiered section.

According to an embodiment, A vehicle may include an energy storage device; at least one electric motor; an electrical power distribution module; and a plurality of lower voltage components; wherein the electrical power distribution module is configured to receive higher voltage power from the energy storage device, wherein the electrical power distribution module is configured to distribute higher voltage power to the at least one electric motor, wherein the electrical power distribution module is configured to distribute lower voltage power to the plurality of lower voltage components

ASPECTS OF THE INVENTION

According to an embodiment, an electrical power distribution module for a vehicle may include an upper module, the upper module may include at least one circuit board configured for mounting in the upper module; and a temperature control system, the temperature control system configured to control a temperature of the at least one circuit board; a plurality of electrical connectors configured for a plurality of different voltages, wherein each electrical connector is one of a positive connector, a negative connector, and a ground connector; and a lower module coupled to the upper module, the lower module comprising may include a plurality of isolated busbars, wherein each isolated busbar is electrically isolated from the surrounding structure, wherein each isolated busbar is one of a positive busbar, a negative busbar, and a ground busbar, wherein the plurality of isolated busbars arranged on opposite sides of the lower module and are arranged in an alternating fashion based on polarity, and wherein each isolated busbar is electrically connected to the plurality of electrical connectors having corresponding voltages and polarity, wherein the plurality of isolated busbars are electrically connected to the at least one circuit board, wherein the plurality of electrical connectors are spaced apart from each other and are configured to provide power and ground connections for at least one vehicle component, wherein a first set of the plurality of isolated busbars is arranged on a first side of the lower module and a second set of the plurality of isolated busbars is arranged on a second side of the lower module opposite the first side, wherein each isolated busbar of the first set of the plurality of isolated busbars corresponds to a different voltage, and wherein each isolated busbar of the second set of the plurality of isolated busbars corresponds to a different voltage.

According to an embodiment, the temperature control system may include a coolant inlet and a coolant outlet formed in the upper module.

According to an embodiment, the temperature control system may include at least one cooling plate configured to control the temperature of the at least one circuit board.

According to an embodiment, the electrical power distribution module is sealed and rated IP 67.

According to an embodiment, the electrical power distribution module is configured to provide energy absorption during a collision.

According to an embodiment, the first set of the plurality of isolated busbars may include a busbar rated for a voltage in a range of 100V to 1000V, and wherein the second set of the plurality of isolated busbars comprises a busbar rated for a voltage in a range of 100V to 1000V.

According to an embodiment, the plurality of electrical connectors may include a positive higher voltage connector and a negative higher voltage connector.

According to an embodiment, the first set of the plurality of isolated busbars may include at least one positive busbar, at least one negative busbar, and at least one ground busbar, the at least one positive busbar is spaced apart from the at least one negative busbar.

According to an embodiment, the second set of the plurality of isolated busbars may include at least one positive busbar, at least one negative busbar, and at least one ground busbar, the at least one positive busbar is spaced apart from the at least one negative busbar.

According to an embodiment, the plurality of isolated busbars may include a third set of the plurality of isolated busbars and a fourth set of the plurality of isolated busbars, the second set of busbars is rated for 48V, the third set of busbars is rated for 24V, and the fourth set of busbars is rated for 12V.

According to an embodiment, the upper module may include a plurality of circuit boards, the plurality of circuit boards are electrically connected to one of the plurality of isolated busbars.

According to an embodiment, a module of an electrical power distribution module for a vehicle, may include a first tiered section having a first step and a second step; a second tiered section having a first step and a second step, wherein the second tiered section is spaced part from the first tiered section; a front surface; and a back surface arranged opposite the front surface, wherein the first tiered section is disposed on a first side between the front surface and the back surface, wherein the second tiered section is disposed on a second side between the front surface and the back surface, wherein a first higher voltage busbar and a first higher voltage electrical connector are coupled to the first step of the first tiered section, wherein a second higher voltage busbar and a second higher voltage electrical connector are coupled to the first step of the second tiered section, wherein a first lower voltage busbar and at least one first lower voltage electrical connector are coupled to the second step of the first tiered section, and wherein a second lower voltage busbar and at least one second lower voltage electrical connector are coupled to the second step of the second tiered section.

According to an embodiment, the first tiered section further comprises a third step and a fourth step, wherein the second tiered section further comprises a third step and a fourth step, wherein a third lower voltage busbar and at least one third lower voltage electrical connector are coupled to the third step of the first tiered section, wherein a fourth lower voltage busbar and at least one fourth lower voltage electrical connector are coupled to the third step of the second tiered section, wherein a fifth lower voltage busbar and a fifth lower voltage electrical connector are coupled to the fourth step of the first tiered section, and wherein a sixth lower voltage busbar and a sixth lower voltage electrical connector are coupled to the fourth step of the second tiered section.

According to an embodiment, the busbars are arranged in the first tiered section such that the polarity of the busbars alternates at each step, and wherein the busbars are arranged in the second tiered section such that the polarity of the busbars alternates to correspond with the first tiered section in an opposite fashion.

According to an embodiment, a first ground busbar is coupled to the first step of one of the first tiered section and the second tiered section, wherein a second ground busbar is coupled to the second step of one of the first tiered section and the second tiered section, wherein a third ground busbar is coupled to the third step of one of the first tiered section and the second tiered section, and wherein a fourth ground busbar is coupled to the fourth step of one of the first tiered section and the second tiered section.

According to an embodiment, each step of the first tiered section corresponds with a different voltage, and wherein each step of the second tiered section corresponds with the step of the first tiered section.

According to an embodiment, the first and second higher voltage busbars are rated for a voltage in the range of 100V-1000V, wherein the first and second higher voltage busbars have opposite polarities.

According to an embodiment, the lower voltage busbars are rated for a voltage of one of 12V, 24V, and 48V.

According to an embodiment, A vehicle may include an energy storage device; at least one electric motor; an electrical power distribution module; and a plurality of lower voltage components; wherein the electrical power distribution module is configured to receive higher voltage power from the energy storage device, wherein the electrical power distribution module is configured to distribute higher voltage power to the at least one electric motor, wherein the electrical power distribution module is configured to distribute lower voltage power to the plurality of lower voltage components According to an embodiment, the electrical power distribution module may include a higher voltage tier configured to receive and distribute higher voltage power and at least one lower voltage tier configured to distribute lower voltage power

BRIEF DESCRIPTION OF DRAWINGS

The description below refers to the following drawings of which.

DETAILED DESCRIPTION

The present disclosure relates to a battery electric vehicle supermodule shaped, sized, dimensioned, and designed for placement within a vehicle. The vehicle may be an electric or hybrid-electric vehicle. The supermodule may be designed such that the supermodule is an electrical power distribution module for providing power to various vehicle components. The electrical power distribution module may be designed in such a way that it is connected to an energy storage device, such as one or more battery packs. The electrical power distribution module may provide a housing for key functional circuit boards of the vehicle. The electrical power distribution module may provide electrical power having different voltages to the various vehicle components. The electrical power distribution module may reduce the required space for mounting. The electrical power distribution module may reduce or simplify the routing of media between vehicular components. This may allow for simplified assembly of the vehicle. As compared to other ways for mounting off-the-shelf components in a power box and having media routed to the components individually, the electrical power distribution module of the present disclosure may result in reduced weight of the vehicle, secure electrical connections, improved protection from the road environment, as well as increased safety during assembly The electrical power distribution module may provide a common electrical connection location for the various vehicle components and their wiring. The common electrical connection location may provide electrical connections to and from the various vehicle components for higher voltage and lower voltage power. The common electrical connection location may be designed such that, for a specific voltage, the positive connection point is located on one side of the electrical power distribution module and the negative connection point is located on the opposite side of the electrical power distribution module. The connection locations for the higher voltage power may be spaced at least the furthest apart such that no accidental discharge occurs. As the voltages of the electrical connections decrease, the distance between the connection locations may be spaced apart at a decreasing distance. For example, in some embodiments, the common electrical connection location may be in the shape of a stepped pyramid or truncated cone. The polarity of the electrical connections may alternate sides of the electrical power distribution module as the voltages of the electrical connections decrease.

Details of exemplary electrical power distribution modules to achieve the aforementioned advantages and benefits are described herein. However, alternatives to the structure, layout, shape, size, arrangement, etc., are contemplated without departing from the goals of providing an electrical power distribution module for distributing electrical power to various vehicle components.

Figure 1:
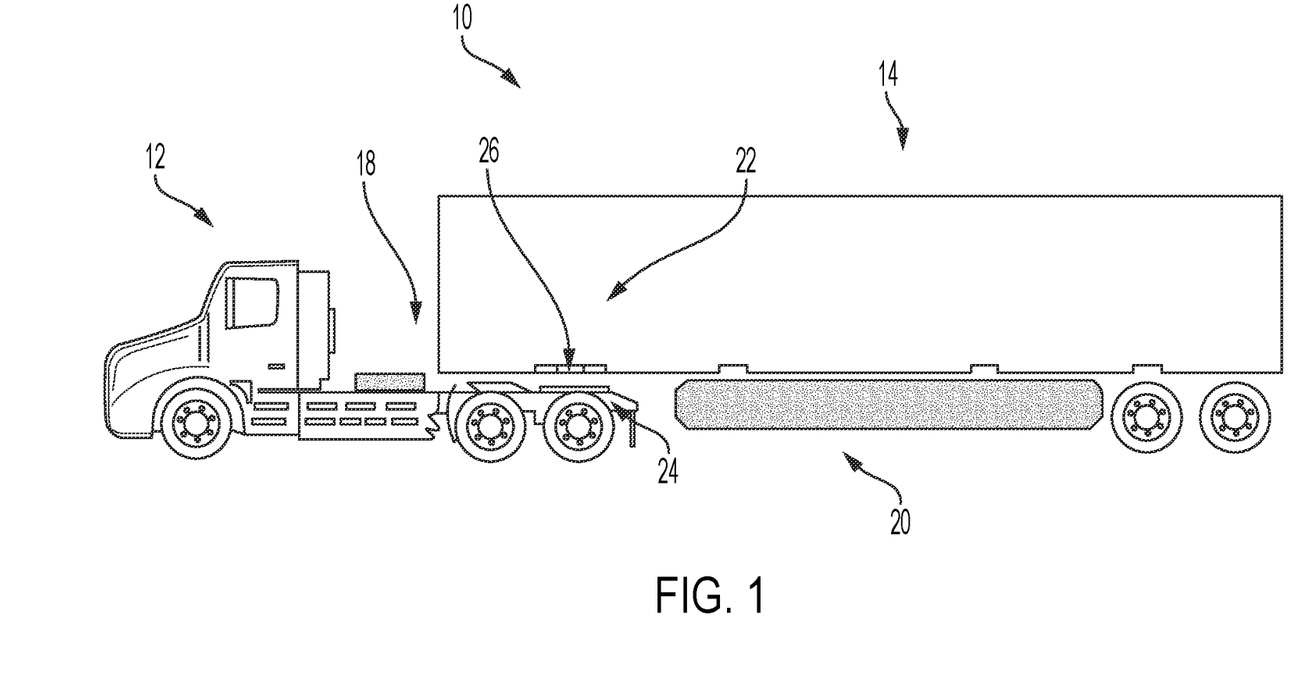
FIG. 1 shows a battery electric vehicle with a battery pack, according to an embodiment of the disclosure.

Referring to FIG. 1, a vehicle 10 is shown. The vehicle 10 may be a BEV. The vehicle 10 may be a BEV having a tractor 12 and a trailer 14. The tractor 12 may include one or more electric motors mounted or coupled to the axles or wheels of the tractor 12 to provide power for the vehicle 10. The tractor 12 may include an energy storage device, such as one or more battery packs 18. The battery packs 18 may be coupled to a chassis of the tractor 12. The trailer 14 may include one or more battery packs 20. The battery packs 20 may be coupled to an underside of the trailer 14. The battery packs 18 and/or the battery packs 20 may store energy to be supplied to the tractor 12 and/or the trailer 14. For example, the battery packs 18, 20 may store energy used for propulsion of the tractor 12, for powering the trailer 14 (e.g., for a refrigerated trailer), or both. Although shown mounted to the chassis of the tractor 12 and the underside of the trailer 14, the battery packs 18, 20 may be mounted in any location on the tractor 12 and trailer 14.

The tractor 12 may include one or more higher and lower voltage components, such as electric motor drives, DC-DC converters, on-board chargers, charge switch units, traction voltage monitoring unit, and various electric control units. Each of these components has a circuit board requiring electrical power provided by the battery packs 18, 20.

Referring to FIGS. 2-6, an electrical power distribution module 30 is shown. The electrical power distribution module 30 may be coupled to the chassis of the tractor 12. The electrical power distribution module 30 may include an upper module 40 and a lower module 50. The electrical power distribution module 30 may be electrically connected to the battery packs 18 and/or the battery packs 20. The electrical power distribution module 30 may be electrically connected to the electric motor. The electrical power distribution module 30 may be electrically connected to various lower voltage components on the vehicle 10. The electrical power distribution module 30 may be sealed to prevent ingress of water, such that the module is IP67 rated.

The battery packs 18, 20 may transfer energy, via the electrical power distribution module 30, to the electric motors and the various lower voltage components on the vehicle 10. Specifically, the battery packs 18, 20 may transfer higher voltage power to the electrical power distribution module 30. The electrical power distribution module 30 may then transfer the higher voltage power to the electric motors. The electrical power distribution module 30 may convert the higher voltage power, received from the battery packs 18, 20, to lower voltage power. For example, the electrical power distribution module 30 may convert the higher voltage power to a lower 12V, 24V, and/or 48V power to be provided to components of the vehicle 10.

Figure 2:
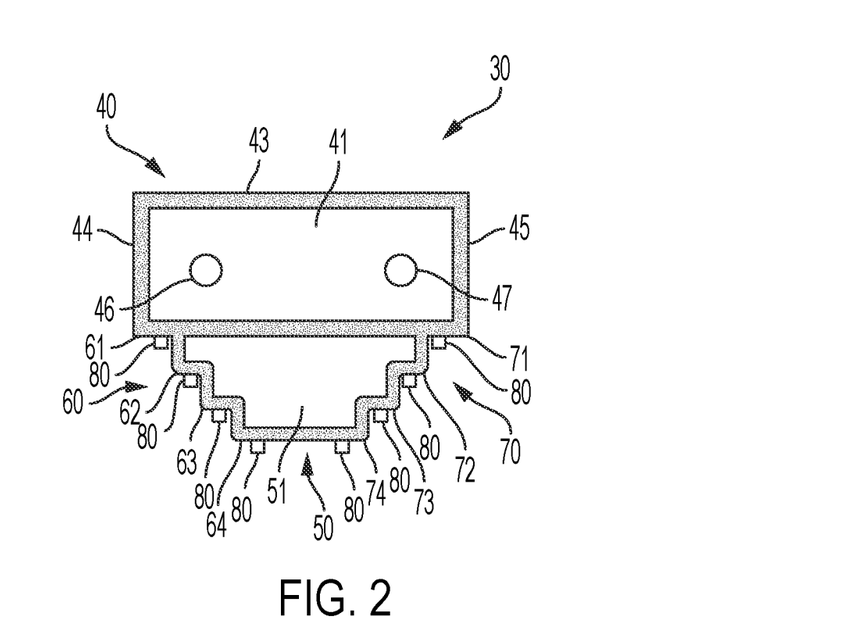
FIG. 2 shows a front view of the electrical power distribution module, according to an embodiment of the disclosure.

Referring to FIG. 2, the electrical power distribution module 30 may include an upper module 40 and a lower module 50. The upper module 40 may be coupled to lower module 50. The upper module 40 and the lower module 50 may be made of the same material. The material may be a structurally durable material, such as an aluminum alloy, stainless steel, hard plastic, or other similar materials. The electrical power distribution module 30 may be coated for electrical insulation to prevent inadvertent grounding. The electrical power distribution module 30 may be configured to provide energy absorption for the vehicle 10 in the event of a vehicular collision.

Figure 4:
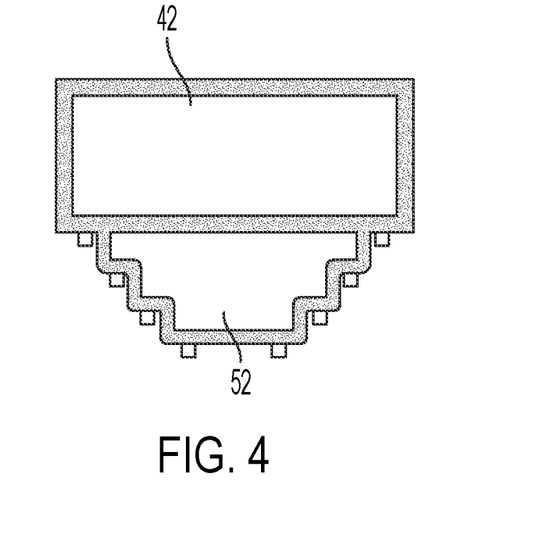
FIG. 4 shows a rear view of the electrical power distribution module of FIG. 2, according to an embodiment of the disclosure.

The upper module 40 may include a front surface 41, a back surface 42 arranged opposite the front surface 41 shown in FIG. 4, a top surface 43, and a first side surface 44 arranged opposite a second side surface 45. The upper module 40 may include a coolant inlet 46 and a coolant outlet 47. While FIG. 2 shows the coolant inlet 46 and the coolant outlet 47 on the front surface 41 of the upper module 40, the coolant inlet 46 and outlet 47 may be arranged on any surface of the upper module 40 and the inlet 46 may be arranged on a different surface of the upper module 40 than the coolant outlet 47. Vehicle components may be mounted on the top surface 43 of the upper module to save space on the vehicle 10. The upper module 40 may include sealed access ports to allow access to an interior of the electrical power distribution module 30. For example, a compartment may be formed in the upper module 40 providing access to fuses within the upper module 40 when the fuses need to be serviced or replaced.

Figure 3:
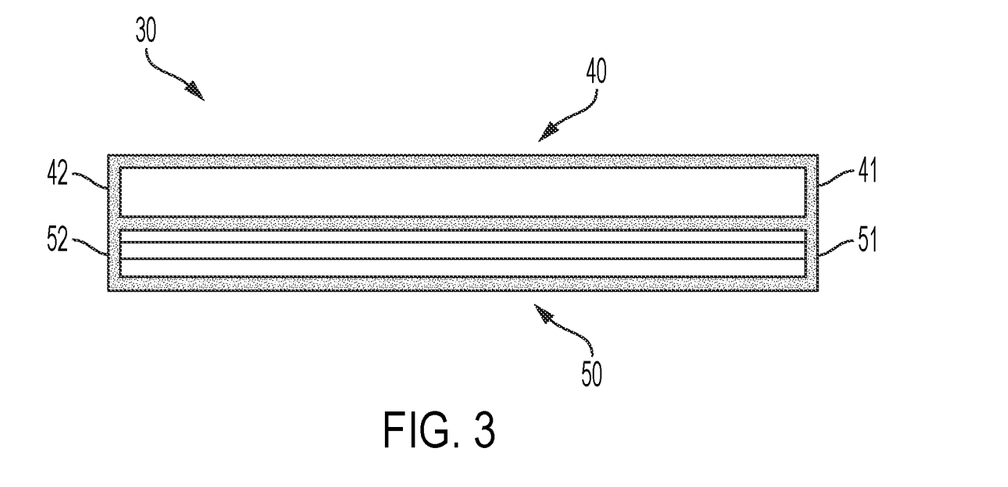
FIG. 3 shows a side view of the electrical power distribution module, according to an embodiment of the disclosure.

Referring to FIGS. 2-4, the lower module 50 may include a front surface 51, a back surface 52 arranged opposite the front surface 51, a first tiered section 60 and a second tiered section 70. The second tiered section 70 may be spaced apart from the first tiered section 60. The tiered sections are coupled to the front surface 51 and the back surface 52. Each tiered section may have multiple steps. For example, the first tiered section and the second tiered section may include a first step 61, 71, a second step 62, 72, a third step 63, 73, and a fourth step 64, 74. Each step of the tiered sections 60, 70 may run the length of the lower module 50 between the front surface 51 and the back surface 52. It is contemplated that each step may be spaced apart from either/both the front surface 51 and the back surface 52. The steps of the tiered sections may be arranged so the first steps 61,71 are a first distance apart; the second steps 62, 72 are a second distance apart; the third steps 63, 73 are a third distance apart; and the fourth steps 64, 74 are a fourth distance apart. The first distance may be greater than the second distance; the second distance may be greater than the third distance; and the third distance may be greater than the fourth distance. The tiered sections may take other forms, such as sloping sides, etc.

Each step of the tiered sections 60, 70 may include one or more electrical connectors 80. The electrical connectors should be spaced from each other. For example, the electrical connectors 80 may be coupled to the horizontal surface of each step of the tiered sections 60, 70, as shown in FIG. 2. It is contemplated that the electrical connectors 80 may be coupled to the vertical surface of each step of the tiered sections 60, 70. The electrical connectors 80 may be, for example, a post for connection with a ring terminal at the end of a wire or cable. The electrical connectors 80 may also be a snap fit connector or any off-the-shelf connector for providing electrical connection.

Each step of the tiered sections 60, 70 may correspond to a different voltage. The steps of the tiered sections 60, 70 having the same voltage may be spaced apart on opposite sides of the lower module such that the positive voltage may be located on one side and the negative voltage may be located on the opposite side. This separation of the positive side from the negative side helps to improve safety during assembly and use. The steps of the tiered sections 60, 70 having different voltages may be spaced apart on the same side of the lower module 50. One step, the first steps 61, 71 in the embodiment shown in FIG. 2, may correspond to a higher voltage step with one or more electrical connectors 80 rated for 100V-1000V. The second steps 62, 72 may correspond to a lower voltage step with one or more electrical connectors 80 rated for 48V. The third steps 63, 73 may correspond to an even lower voltage step with one or more electrical connectors 80 rated for 24V. The fourth steps 64, 74 may correspond to still a further lower voltage step with one or more electrical connectors 80 rated for 12V.

Figure 5:
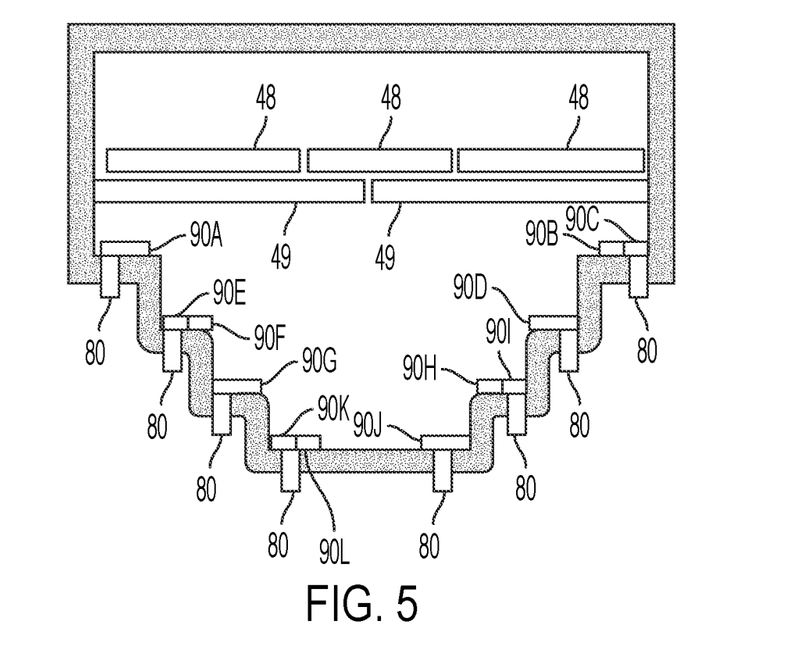
FIG. 5 shows a front-section view of the electrical power distribution module of FIG. 2, according to an embodiment of the disclosure.

Referring to FIG. 5, the electrical power distribution module 30 is shown without the front surface 41 of the upper module 40 and without the front surface 51 of the lower module 50. As seen in FIG. 5, the upper module 40 may include one or more circuit boards 48 mounted within the upper module 40. The circuit boards 48 may be mounted parallel to the top surface 43 of the upper module, as shown in FIG. 5. In another embodiment, the circuit boards 48 may be mounted parallel to the front surface 41 of the upper module 40. In another embodiment, the circuit boards 48 may be mounted parallel to the side surfaces 44, 45 of the upper module 40. The sealed access ports of the upper module may also provide access to the circuit boards 48 to allow for service, repair, or replacement of the circuit boards 48.

The circuit boards 48 may correspond with the various higher and lower voltage components previously discussed. These components include, for example, electric motor drives, DC-DC converters, on-board chargers, charge switch units, traction voltage monitoring unit, and various electric control units. The circuit boards 48 may be configured to receive and distribute electrical power at different voltages. The circuit boards 48 may receive and distribute higher voltage electrical power in the range of 100V-1000V. The circuit boards 48 may also receive and distribute lower voltage electrical power having a voltage of 12V, 24V, or 48V.

The upper module 40 may include a temperature control system to control the temperature of the circuit boards 48. The temperature control system may include one or more cooling plates 49. The cooling plates 49 may be coupled to coolant inlet 46 and coolant outlet 47 such that coolant passes through cooling plates 49. The cooling plates 49 may be arranged to dissipate heat from the circuit boards 48. The temperature control system may also include a fan mounted to the top surface 43 of the upper module 40 or may be mounted elsewhere on the vehicle 10. The temperature control system may be arranged such that the entire system is located within the upper module 40, such that the upper module 40 would not require the coolant inlet 46 and outlet 47.

The lower module 50 may include a plurality of isolated busbars 90A-L coupled to the lower module 50. The isolated busbars 90A-L may be electrically isolated from the surrounding structure of the lower module 50. The isolated busbars 90A-L may be coated with an insulated material to provide the electric isolation. The plurality of isolated busbars 90A-L may be electrically connected to the electrical connectors 80. Each busbar 90A-L may be coupled to one of the steps of the tiered sections 60, 70. Each busbar 90A-L may be coupled to the horizontal surface of the steps, as shown in FIG. 5. It is contemplated that each busbar 90A-L may be coupled to the vertical surface of the steps.

The plurality of busbars 90A-L may include a set of higher voltage busbars 90A-C. The higher voltage busbars 90A-C may be rated to receive and distribute electrical power with voltage in the range of 100V-1000V. The higher voltage busbars 90A-C may be coupled to the first steps 61, 71 of the tiered sections 60, 70. The higher voltage busbars 90A-C may include a positive higher voltage busbar 90A; a negative higher voltage busbar 90B; and a ground higher voltage busbar 90C. The positive higher voltage busbar 90A may be coupled to the first step 61 of the first tiered section 60. The negative higher voltage busbar 90B and the ground higher voltage busbar 90C may be coupled to the first step 71 of the second tiered section 70.

The plurality of busbars 90A-L may include a first set of lower voltage busbars 90D-F rated to carry a voltage of 48V. The first set of lower voltage busbars 90D-F may be coupled to the second steps 62, 72 of the tiered sections 60, 70. The first set of lower voltage busbars may include a positive 48V busbar 90D; a negative 48V busbar 90E; and a ground 48V busbar 90F. The negative 48V busbar 90E and the ground 48V busbar 90F may be coupled to the second step 62 of the first tiered section 60. The positive 48V busbar 90D may be coupled to the second step 72 of the second tiered section 70.

The plurality of busbars 90A-L may include a second set of lower voltage busbars 90G-I rated to carry a voltage of 24V. The second set of lower voltage busbars 90G-I may be coupled to the third steps 63, 73 of the tiered sections 60, 70. The second set of lower voltage busbars may include a positive 24V busbar 90G; a negative 24V busbar 90H; and a ground 24V busbar 90I. The positive 24V busbar 90G may be coupled to the third step 63 of the first tiered section 60.

The negative 24V busbar 90H and the ground 24V busbar 90I may be coupled to the third step 73 of the second tiered section 70.

The plurality of busbars 90A-L may include a third set of lower voltage busbars 90J-L rated to carry a voltage of 12V. The third set of lower voltage busbars 90J-L may be coupled to the fourth steps 64, 74 of the tiered sections 60, 70. The third set of lower voltage busbars 90J-L may include a positive 12V busbar 90J; a negative 12V busbar 90K; and a ground 12V busbar 90L. The negative 12V busbar 90K and the ground 12V busbar 90L may be coupled to the fourth step 64 of the first tiered section 60. The positive 12V busbar 90J may be coupled to the fourth step 74 of the second tiered section 70.

Although the busbars 90A-L may be arranged as described above, the busbars 90A-L may be rated for different voltages according to the requirements of the vehicle components. The busbars 90A-L may be arranged such that the positive busbars are 90A, 90D, 90G, and 90J coupled to one of the tiered sections and the negative busbars 90B, 90E, 90H, and 90I are coupled to the opposite tiered section. For example, the positive higher voltage busbar 90A and the positive lower voltage busbars 90D, 90G, and 90J may be arranged on the first tiered section 60. The negative higher voltage busbar 90B and the negative lower voltage busbars 90E, 90H, and 90I may be arranged on the second tiered section 70. The first tiered section 60 would be the positive side of the lower module 50 and the second tiered section 70 would be the negative side of the lower module 50.

The plurality of busbars 90A-L may be electrically connected to the one or more circuit boards 48 to provide electric power to the vehicle components. The electrical connection between the plurality of busbars 90A-L and the one or more circuit boards may be provided by wiring or one or more circuit board busbars, as well as other connections known in the art. More than one circuit board may be electrically connected to one of the plurality of busbars 90A-L. One circuit board may connect to more than one busbar of different voltages.

Figure 6:
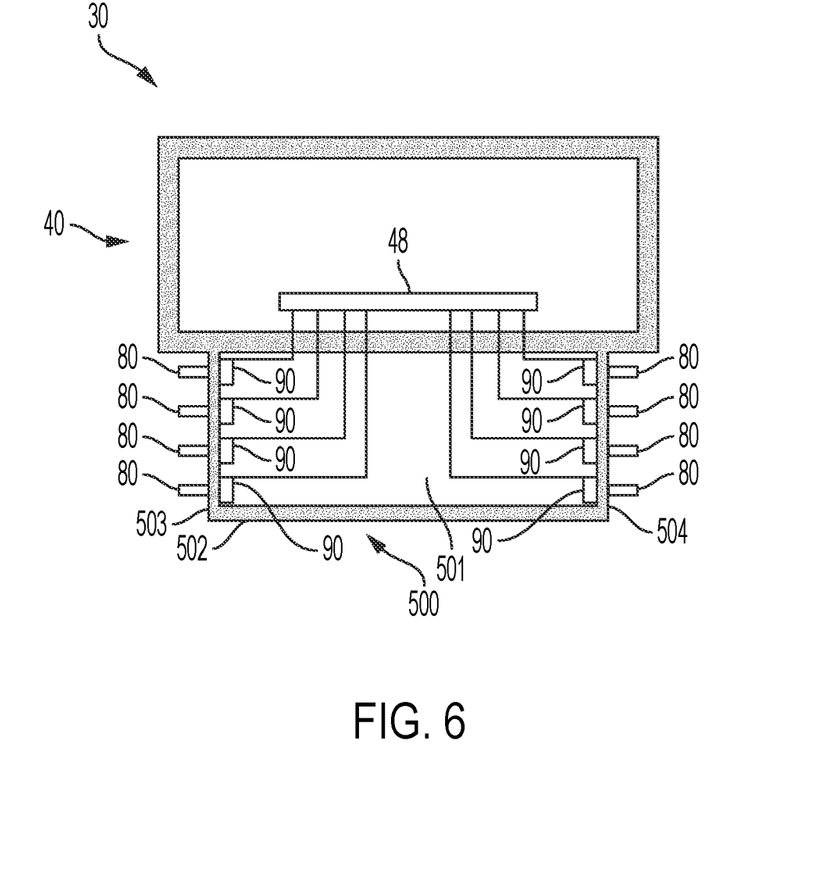
FIG. 6 shows a front view of the electrical power distribution module, according to an embodiment of the disclosure.

Referring to FIG. 6, an embodiment of the electrical power distribution module 30 is shown. The electrical power distribution module 30 may include upper module 40 as shown in FIGS. 3-5. The electrical power distribution module 30 may include the lower module 500 coupled to the upper module 40.

The lower module 500 may include a front surface 501, a back surface (not shown) arranged opposite the front surface 501, a first side surface 503 perpendicular to the front surface 501, a second side surface 504 opposite the first side surface 503, and a bottom surface 502 opposite the top surface 43 of the upper module 40, as shown in FIG. 2. A plurality of electrical connectors 80 may be coupled to the first and second side surfaces 503, 504. The plurality of electrical connectors 80 may be rated for different voltages. The electrical connectors 80 coupled to the first side surface 503, having a specific voltage, may be aligned in the same plane as the electrical connectors 80 coupled to the second side surface 504, having the same voltage. While the plane is shown as parallel in FIG. 6, the plane may be parallel to the front surface 501 of the lower module. The electrical connectors 80 coupled to the first side surface, having a specific voltage, may be spaced apart in a parallel plane from the electrical connectors 80 on the first side surface, having a different voltage. The electrical connectors 80 coupled to the second side surface, having a specific voltage, may be spaced apart in a parallel plane from the electrical connectors 80 on the second side surface, having a different voltage.

The lower module 500 may include a plurality of isolated busbars 90 coupled to the first and second side surfaces 503, 504. The plurality of busbars 90 may be coupled to and electrically connected to the electrical connectors 80. The plurality of busbars 90 may be rated for voltages corresponding to the electrical connectors 80 to which the busbars 90 are electrically connected. The plurality of busbars 90 may be further electrically connected to circuit board 48. The busbars 90 coupled to the first side surface, having a specific voltage, may be aligned to be in the same plane as the busbars 90 coupled to the second side surface, having the same voltage. While the plane is shown as parallel in FIG. 6, the plane may be parallel to the front surface 501 of the lower module. The busbars 90 coupled to the first side surface, having a specific voltage, may be spaced apart in a parallel plane from the busbars 90 coupled to the first side surface 503, having a different voltage.

The plurality of isolated busbars 90 in lower module 500 may be arranged in alternating and opposite fashion as discussed above in regard to FIG. 5. For example, the isolated busbars 90 coupled to first side surface 503 may be arranged such that the polarity of the busbar switches from positive to negative as the voltage changes. One set of the plurality of isolated busbars 90 may carry higher voltage in the range of 100V-1000V. The plurality of isolated may carry a voltage that is one of 48V, 24V, and 12V.

Use of language such as "at least one of X, Y, and Z," "at least one of X, Y, or Z," "at least one or more of X, Y, and Z," "at least one or more of X, Y, or Z," "at least one or more of X, Y, and/or Z," or "at least one of X, Y, and/or Z," are intended to be inclusive of both a single item (just X, or just Y, or just Z) and multiple items (i.e., {X and Y}, {X and Z}, {Y and Z}, or {X, Y, and Z}). "At least one of" is not intended to convey a requirement that each possible item must be present.

Although the foregoing description is directed to the preferred embodiments of the invention, it is noted that other variations and modifications will be apparent to those skilled in the art, and may be made without departing from the spirit or scope of the invention. Moreover, features described in connection with one embodiment of the invention may be used in conjunction with other embodiments, even if not explicitly stated above.

The invention claimed is:

1. An electrical power distribution module for a vehicle, comprising:
   an upper module,
   the upper module comprising:
   at least one circuit board mounted in the upper module; and
   a temperature control system, the temperature control system configured to control a temperature of the at least one circuit board; and
   a lower module coupled to the upper module, the lower module comprising:
   a plurality of electrical connectors configured for a plurality of different voltages, wherein each electrical connector is one of a positive connector, a negative connector, and a ground connector; and
   a plurality of isolated busbars,
   wherein each isolated busbar is electrically isolated from a surrounding structure, wherein each isolated busbar is one of a positive busbar, a negative busbar, and a ground busbar, wherein the plurality of isolated busbars arranged on opposite sides of the lower module and are arranged in an alternating fashion based on polarity, and wherein each isolated busbar is electrically connected to the plurality of electrical connectors having corresponding voltages and polarity, wherein the plurality of isolated busbars are electrically connected to the at least one circuit board, wherein the plurality of electrical connectors are spaced apart from each other and are configured to provide power and ground connections for at least one vehicle component, wherein a first set of the plurality of isolated busbars is arranged on a first side of the lower module and a second set of the plurality of isolated busbars is arranged on a second side of the lower module opposite the first side, wherein each isolated busbar of the first set of the plurality of isolated busbars corresponds to a different voltage, and wherein each isolated busbar of the second set of the plurality of isolated busbars corresponds to a different voltage.

2. The electrical power distribution module of claim 1, wherein the temperature control system further comprises a coolant inlet and a coolant outlet formed in the upper module.

3. The electrical power distribution module of claim 1, wherein the temperature control system further comprises at least one cooling plate configured to control the temperature of the at least one circuit board.

4. The electrical power distribution module of claim 1, wherein the electrical power distribution module is sealed.

5. The electrical power distribution module of claim 1, wherein the electrical power distribution module includes energy absorption material to absorb energy during a collision.

6. The electrical power distribution module of claim 1, wherein the first set of the plurality of isolated busbars comprises a busbar rated for a voltage in a range of 100V to 1000V, and wherein the second set of the plurality of isolated busbars comprises a busbar rated for a voltage in a range of 100V to 1000V.

7. The electrical power distribution module of claim 6, wherein the plurality of electrical connectors comprises a positive higher voltage connector and a negative higher voltage connector.

8. The electrical power distribution module of claim 1, wherein a first set of the plurality of isolated busbars comprises at least one positive busbar, at least one negative busbar, and at least one ground busbar, wherein the at least one positive busbar is spaced apart from the at least one negative busbar.

9. The electrical power distribution module of claim 7, wherein a second set of the plurality of isolated busbars comprises at least one positive busbar, at least one negative busbar, and at least one ground busbar, wherein the at least one positive busbar is spaced apart from the at least one negative busbar.

10. The electrical power distribution module of claim 9, wherein the plurality of isolated busbars further comprises a third set of the plurality of isolated busbars and a fourth set of the plurality of isolated busbars, wherein the second set of busbars is rated for 48V, the third set of busbars is rated for 24V, and the fourth set of busbars is rated for 12V.

11. The electrical power distribution module of claim 1, the upper module further comprising a plurality of circuit boards, wherein the plurality of circuit boards are electrically connected to one of the plurality of isolated busbars.

* * * * *